3,088,910
CORROSION INHIBITORS
Harry W. Rudel, Roselle, and William Seitz, Union, N.J., assignors to Esso Research and Engineering Company, a corporation of Delaware
No Drawing. Filed Aug. 10, 1959, Ser. No. 832,485
11 Claims. (Cl. 252—32.5)

This invention relates to a new and improved corrosion inhibitor. More particularly, this invention relates to a corrosion inhibitor prepared by neutralizing an alkyl phosphoric acid with certain high molecular weight imidazoline derivatives and to lubricating oil and metal coating compositions containing said corrosion inhibitors.

Imidazoline derivatives are known in the prior art to be excellent rust inhibitors and are marketed as such under various trade names. For example, 1(2-hydroxyethyl)-2-heptadecenyl imidazoline is marketed commercially as Amine O. These additives, however, have been used primarily as corrosion inhibitors in lubricating oils in either extremely small proportions or in connection with dispersing agents because of their limited solubility.

It has now been found that by neutralizing these imidazoline derivatives with an alkyl phosphoric acid even more effective rust inhibitors are formed. In addition, the phosphoric adduct tends to solubilize the imidazoline in oil and thus render the new compound especially suitable as a corrosion inhibitor for lubricating oils and coating compositions.

The imidazoline compounds useful in the present invention are those having the following general formula:

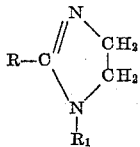

wherein R is a straight or branched chain alkyl or alkylene radical containing from about 2 to 22 and preferably 10 to 20 carbon atoms; and $R_1$ is a substituent selected from the group consisting of hydrogen and hydroxy or amino substituted alkyl groups having 1 to 6 carbon atoms. These imidazoline derivatives are readily prepared by reacting the proper organic acid with a suitable diamine or hydroxy or amino substituted diamine. For example, heptadecenyl imidazoline is prepared by reacting two moles of oleic acid with about two moles of ethylene diamine in the presence of an organic diluent such as xylene. The reaction involved in the above synthesis is as follows:

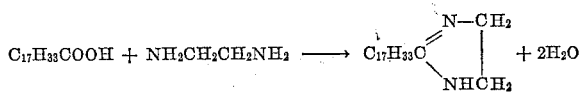

The alkyl phosphoric acids used in the preparation of the corrosion inhibitors of this invention are preferably dialkyl phosphoric acids having from $C_3$ to $C_{18}$ carbon atoms per alkyl group. These phosphoric acids are prepared by reacting about 4 moles of a $C_3$ to $C_{18}$ alcohol with a mole of phosphorus pentoxide. The reaction proceeds according to the following equation:

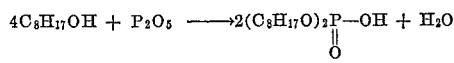

The water of the reaction is removed by blowing the reaction mixture with nitrogen at a temperature of about 250° F. The highly branched $C_4$ to $C_{16}$ alcohols, such as those prepared by the Oxo process (that is by the catalytic carbonylation of monoolefins with CO and hydrogen), are particularly useful in the preparation of the alkyl phosphoric acids used in forming the additives of this invention. The highly branched dialkyl groups of the phosphoric acid tend to increase the solubility of the imidazoline phosphoric acid reaction product in oil.

The corrosion inhibitors of this invention are formed by neutralizing one to four moles of the imidazoline derivatives with one to two moles of the alkyl phosphoric acid. The neutralization reaction is conducted at room temperature by simple mixing of the reactants.

The corrosion inhibitors of this invention will comprise 0.02 to 10.00 wt. percent and preferably 0.05 to 5.00 wt. percent of the total composition when used as a corrosion inhibitor in lubricating oils. The lubricating oil may be either a mineral or synthetic lubricating oil composition. For example, operable synthetic lubricants include simple and complex esters of high, low, and intermediate molecular weight fatty acids. Operable mineral oil lubricants will have a viscosity in the range of 50 SSU at 100° F. to 300 SSU at 210° F. and a viscosity index of about 0 to 150.

Other additives such as extreme pressure agents, viscosity index improvers, pour point depressants, etc., may be used in the lubricating oil compositions of this invention.

The metal coating compositions of this invention are prepared by forming an oil solution of the corrosion inhibitors of this invention and adding to this oil solution a film forming product containing an oil-wax mixture which has been cut back with a volatile solvent. Corrosion resistant coating compositions may also be formed with the corrosion inhibitors of this invention by diluting an asphalt with a volatile solvent and adding in the range of 0.3 to 10.0 wt. percent, based on the total weight of the composition, of the corrosion inhibiting compounds of this invention.

EXAMPLE I

The following illustrates the preparation of the corrosion inhibitors of this invention. Two moles of oleic acid (565 grams) were added to 2 moles of ethylene diamine (120 grams) with stirring and external cooling. Xylene was then added to the mixture and the combination refluxed with stirring through a water separator. After about three hours of refluxing with the pot temperature ranging between 255° F. and 305° F. some 90 cc. of water had been collected. On cooling to room temperature the reaction mixture became insoluble in the xylene diluent. The xylene was finally distilled off under reduced pressure at a final pot temperature of 275° F. and 10 mm. of mercury pressure. 580 grams of the product (heptadecenyl imidazoline) were obtained.

One mole of the heptadecenyl imidazoline was then neutralized by the addition of one mole of a highly branched dialkyl phosphoric acid. The dialkyl phosphoric acid was prepared by reacting 4 moles of $C_8$ oxo alcohol with one mole of phosphorus pentoxide to form 2 moles of a dioctyl phosphoric acid and one mole of water. The water was removed by blowing the reaction mixture with nitrogen at a temperature of about 250° F. The above corrosion inhibitor, i.e. the neutralized imidazoline, is hereinafter referred to as product A.

A second corrosion inhibitor of this invention was prepared according to the above procedure except that 2 moles of amino ethyl ethanolamine was substituted for the ethylene diamine in the above formulation. The imidazoline derivative formed by use of the amino ethyl ethanolamine is represented by the following formula:

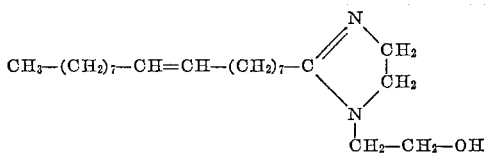

1(2-hydroxy ethyl)-2-heptadecenyl imidazoline

This imidazoline derivative was neutralized with dioctyl phosphoric acid as was product A. The final product is hereinafter referred to as product B.

For comparison the 1(2-hydroxy ethyl)-2-heptadecenyl imidazoline as used in product B above, was added to a mineral lubricating oil without being neutralized by addition of an alkyl phosphoric acid. This un-neutralized imidazoline derivative is hereinafter referred to as product C.

Table I illustrates the results obtained in a Humidity Cabinet Test and in an ASTM Rust Test, for mineral oil compositions containing minor amounts of products A, B, and C. The Humidity Cabinet Test is the standard military specification JAN–H–792 Humidity Cabinet Test. The ASTM Rust Test is ASTM D–665–54 and consists of maintaining a polished 1020 steel spindle, 0.5″ in diameter, in contact with a stirred mixture of 300 ml. of sample and 30 ml. of distilled water at 140° F. for 24 hours. At the end of this period the steel spindle is washed with naphtha and examined for the extent of rust formation. If synthetic sea water is used instead of distilled water, the test is markedly more severe.

Table I
RESULTS OF RUST TESTS

| Product | Humidity Cabinet[1] Life, days | ASTM Rust Test[2] Distilled Water, percent rust |
| --- | --- | --- |
| A | 12 | 0 |
| B | 10 | 0 |
| C | 2 | 50 |
| No additive | 1 | 100 |

[1] Blends of 5.0 wt. percent in 55 vis./210° F. naphthenic oil designed to provide short lives in humidity cabinet, so as to accelerate the comparative test.
[2] Blends of 0.1 wt. percent in 43 vis./210° F. extracted Mid-Continent oil. Blend A also gives 0% rusting in synthetic sea water test.

The above results clearly illustrate that the imidazoline derivatives neutralized with alkyl phosphoric acids are decidedly more effective than the straight imidazoline derivatives of the prior art. Further, the non-neutralized imidazoline (product C) was not completely soluble in the mineral oil when added in 5.0 wt. percent concentration and gave a turbid solution. The corrosion inhibitors of this invention (products A and B) were completely oil soluble in 5.0 wt. percent concentration and gave clear solutions.

The above example is merely illustrative of the corrosion inhibitors of this invention and is not intended to limit or restrict the invention in any way.

What is claimed is:

1. A corrosion inhibitor comprising a neutralization product of an alkyl phosphoric acid and an imidazoline having the general formula:

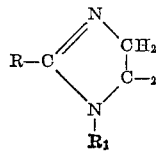

wherein R is selected from the group consisting of alkyl and alkylene radicals containing from about 2 to 22 carbon atoms; and $R_1$ is a substituent selected from the group consisting of hydrogen and hydroxy substituted and amino substituted alkyl groups having 1 to 6 carbon atoms, said alkyl phosphoric acid having alkyl groups of from 3 to 18 carbon atoms.

2. The corrosion inhibitor according to claim 1 wherein R is selected from the group consisting of alkyl and alkylene radicals containing from 10 to 20 carbon atoms and said alkyl phosphoric acid is a dialkyl phosphoric acid.

3. A lubricating oil composition comprising a major proportion of a lubricating oil and 0.02 to 10.0 wt. percent of the neutralization product of an alkyl phosphoric acid and an imidazoline having the following general formula:

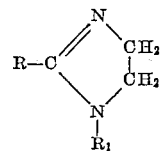

wherein R is selected from the group consisting of alkyl and alkylene radicals containing from about 2 to 22 carbon atoms; and $R_1$ is a substituent selected from the group consisting of hydrogen and hydroxy substituted and amino substituted alkyl groups having 1 to 6 carbon atoms, said alkyl phosphoric acid having alkyl groups of from 3 to 18 carbon atoms.

4. The lubricating oil composition according to claim 3 wherein R is selected from the group consisting of alkyl and alkylene radicals containing from 10 to 20 carbon atoms.

5. A lubricating oil composition according to claim 4, wherein $R_1$ is hydrogen.

6. A lubricating oil composition according to claim 4, wherein $R_1$ is a hydroxy ethyl group.

7. A corrosion inhibitor comprising a neutralization product of heptadecenyl imidazoline and a dialkyl phosphoric acid having alkyl groups of about 8 carbon atoms.

8. A corrosion inhibitor comprising a neutralization product of 1(2-hydroxy ethyl)-2-heptadecenyl imidazoline and a dialkyl phosphoric acid having alkyl groups of about 8 carbon atoms.

9. A lubricating oil composition comprising a major proportion of a lubricating oil and 0.05 to 5.0 weight percent of the neutralization product of heptadecenyl imidazoline and a dialkyl phosphoric acid having alkyl groups of about 8 carbon atoms.

10. A lubricating oil composition comprising a major proportion of a lubricating oil and 0.05 to 5.0 weight percent of the neutralization product of 1(2-hydroxy ethyl)-2-heptadecenyl imidazoline and a dialkyl phosphoric acid having alkyl groups of about 8 carbon atoms.

11. An improved method of inhibiting corrosion of a metal surface which comprises applying to the said surface a petroleum hydrocarbon coating into which has been incorporated about 1.0 to 10.0 wt. percent, based on the total weight of said coating composition, of the neutralization product of an alkyl phosphoric acid and an imidazoline having the general formula:

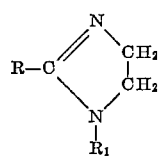

wherein R is selected from the group consisting of alkyl and alkylene radicals containing from about 2 to 22 carbon atoms; and $R_1$ is a substituent selected from the group consisting of hydrogen and hydroxy substituted and amino substituted alkyl groups having 1 to 6 carbon atoms, said alkyl phosphoric acid having alkyl groups of from 3 to 18 carbon atoms.

(References on following page)

References Cited in the file of this patent

UNITED STATES PATENTS

| | | | |
|---|---|---|---|
| Re. 23,227 | Blair et al. | May 9, | 1950 |
| 2,224,695 | Prutton | Dec. 10, | 1940 |
| 2,371,851 | Smith et al. | Mar. 20, | 1945 |
| 2,413,852 | Turner | Jan. 7, | 1947 |
| 2,418,077 | Kyrides et al. | Mar. 25, | 1947 |
| 2,442,582 | Bishop | June 1, | 1948 |
| 2,520,102 | Tryon | Aug. 22, | 1950 |
| 2,605,226 | Vaughn | July 29, | 1952 |
| 2,728,644 | Vaughn | Dec. 27, | 1955 |
| 2,728,728 | Vaughn | Dec. 27, | 1955 |
| 2,763,614 | Cantrell et al. | Sept. 18, | 1956 |
| 2,839,468 | Stewart et al. | June 17, | 1958 |
| 2,848,414 | Chenicek | Aug. 19, | 1959 |
| 2,945,821 | Sterlin | July 19, | 1960 |
| 2,994,596 | Sterlin | Aug. 1, | 1961 |
| 3,024,236 | Hughes | Mar. 6, | 1962 |

FOREIGN PATENTS

| | | | |
|---|---|---|---|
| 782,879 | Great Britain | Sept. 11, | 1957 |
| 578,366 | Canada | June 23, | 1959 |